(12) United States Patent
 Zhang

(10) Patent No.: US 10,606,109 B2
(45) Date of Patent: Mar. 31, 2020

(54) DISPLAY DEVICE

(71) Applicant: HUIZHOU CHINA STAR OPTOELECTRONICS TECHNOLOGY CO., LTD., Huizhou Guangdong (CN)

(72) Inventor: Yanxue Zhang, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 150 days.

(21) Appl. No.: 15/754,387

(22) PCT Filed: Jan. 17, 2018

(86) PCT No.: PCT/CN2018/073086
§ 371 (c)(1),
(2) Date: Feb. 22, 2018

(87) PCT Pub. No.: WO2019/127720
PCT Pub. Date: Jul. 4, 2019

(65) Prior Publication Data
US 2019/0384092 A1 Dec. 19, 2019

(30) Foreign Application Priority Data

Dec. 28, 2017 (CN) .......................... 2017 1 1463917

(51) Int. Cl.
*G09F 13/04* (2006.01)
*G02F 1/1333* (2006.01)
(Continued)

(52) U.S. Cl.
CPC ..... *G02F 1/133308* (2013.01); *G02B 6/0051* (2013.01); *G02B 6/0053* (2013.01);
(Continued)

(58) Field of Classification Search
CPC .......... H05K 2201/10136; H05K 2201/10128; G02F 1/13452
See application file for complete search history.

(56) References Cited

U.S. PATENT DOCUMENTS 10,379,417 B2 *  8/2019  Oka ................... G02F 1/136286
10,401,560 B2 *  9/2019  Kawata ................. G02F 1/1345
(Continued)

FOREIGN PATENT DOCUMENTS

CN  1023436321 A  2/2012
CN  106444129 A   2/2017
(Continued)

*Primary Examiner* — Andrew J Coughlin
(74) *Attorney, Agent, or Firm* — Hemisphere Law, PLLC; Zhigang Ma

(57) ABSTRACT

The present disclosure provides a display device including a display panel, a driving circuit, a chip on film and an outer frame, wherein the outer frame includes a bottom frame and a side frame, the driving circuit is located between the display panel and the bottom frame, the display panel includes a TFT array substrate, the TFT array substrate includes a display portion and a bending portion, the display portion is disposed opposite to the bottom frame, the bending portion is disposed opposite to the side frame, and the bending portion is connected to the driving circuit through the chip on film. The TFT array substrate for a display device provided by the present disclosure includes a display portion and a bending portion, the bending portion is connected with the driving circuit through the chip on film, the COF is adhered to the OLB area on the bending portion.

7 Claims, 1 Drawing Sheet

(51) Int. Cl.
*F21V 8/00* (2006.01)
*G02F 1/1335* (2006.01)
*G02F 1/1368* (2006.01)

(52) U.S. Cl.
CPC ......... *G02B 6/0055* (2013.01); *G02F 1/1368* (2013.01); *G02F 1/133514* (2013.01); *G02F 2001/13332* (2013.01); *G02F 2001/133314* (2013.01)

(56) References Cited

U.S. PATENT DOCUMENTS

| | | | |
|---|---|---|---|
| 2011/0157512 A1* | 6/2011 | Mishima | G02B 6/0068 349/58 |
| 2011/0187965 A1* | 8/2011 | Ooishi | G09F 13/04 349/62 |
| 2012/0249927 A1* | 10/2012 | Nakagawa | G02F 1/133615 349/65 |
| 2016/0093685 A1* | 3/2016 | Kwon | H01L 51/5237 257/40 |
| 2016/0104441 A1* | 4/2016 | Lee | G09G 3/3622 345/204 |
| 2016/0259189 A1 | 9/2016 | Kuramoto | |
| 2017/0006738 A1* | 1/2017 | Lee | G02F 1/13452 |

FOREIGN PATENT DOCUMENTS

| | | |
|---|---|---|
| CN | 106526931 A | 3/2017 |
| CN | 206363042 U | 7/2017 |
| CN | 107505785 A | 12/2017 |

\* cited by examiner

DISPLAY DEVICE

RELATED APPLICATIONS

The present application is a National Phase of International Application Number PCT/CN2018/073086, filed Jan. 17, 2018, and claims the priority of China Application 201711463917.5, filed Dec. 28, 2017.

FIELD OF THE DISCLOSURE

The present disclosure relates to a display technology field, and more particularly to a display device.

BACKGROUND OF THE DISCLOSURE

In the conventional liquid crystal module or all-in-one apparatus, it is usually necessary to connect an Outer Lead Bonding (OLB) area of the TFT array substrate through the lead by using a chip on film (COF), so that the signal integrated in the IC on the COF is conducted to the TFT array substrate through the OLB area. However, in the conventional liquid crystal module or all-in-one apparatus, the OLB area of the glass surface of the TFT array substrate and the display area of the glass surface of the TFT array substrate are located in the same plane, so that a frame or a glue must be designed to cover the OLB area of the glass surface of the TFT array substrate, which will increase the border of the liquid crystal module or all-in-one device and increase the cost.

SUMMARY OF THE DISCLOSURE

In order to solve the shortcomings of the prior art, the present disclosure provides a display device, which can realize the frameless design and enhance the quality while reducing the cost.

A specific technical solution proposed by the present disclosure is to provide a display device including a display panel, a driving circuit, a chip on film and an outer frame, wherein the outer frame includes a bottom frame and a side frame, the driving circuit is located between the display panel and the bottom frame, the display panel includes a TFT array substrate, the TFT array substrate includes a display portion and a bending portion, the display portion is disposed opposite to the bottom frame, the bending portion is disposed opposite to the side frame, and the bending portion is connected to the driving circuit through the chip on film.

Optionally, the display panel further includes a CF substrate disposed on the display portion, the length of the CF substrate in a direction perpendicular to the side frame is greater than the length of the display portion in a direction perpendicular to the side frame.

Optionally, the display device further includes a plastic frame disposed between the TFT array substrate and the bottom frame, the plastic frame includes a horizontal portion and a vertical portion, the horizontal portion is located between the display portion and the bottom frame and is adhered to the display portion, the bending portion is located between the vertical portion and the side frame, and the vertical portion is adhered to the bending portion.

Optionally, the display panel further includes a backlight module, the backlight module includes a backplane, a backlight source and a light guide plate, the backlight source is disposed on the backplane, and the backlight source and the light incident surface of the light guide plate are opposite to each other.

Optionally, the backplane includes a bottom plate and a side plate, the vertical portion is located between the side plate and the bending portion, the side plate is adhered to the vertical portion, the light guide plate is disposed above the bottom plate, and the driving circuit is disposed on a surface of the bottom plate facing the bottom frame.

Optionally, the backlight source is disposed on the bottom plate and between the bottom plate and the light guide plate.

Optionally, the backlight source is disposed on the side plate.

Optionally, the backlight module further includes a reflection sheet and an optical film set, the reflection sheet is located between the light guide plate and the bottom plate, and the optical film set is located between the light guide plate and the horizontal portion.

Optionally, the optical film set includes a diffusion sheet, a lower brightness enhancement film and an upper brightness enhancement film, the lower brightness enhancement film is located between the upper brightness enhancement film and the diffusion sheet, the diffusion sheet is located between the lower brightness enhancement film and the light guide plate.

Optionally, the display panel is an OLED.

The TFT array substrate for a display device provided by the present disclosure includes a display portion and a bending portion, the display portion is disposed opposite to the bottom frame, the bending portion is disposed opposite to the side frame, the bending portion is connected with the driving circuit through the chip on film, the COP is adhered to the OLB area on the bending portion, eliminating the need for an additional front bezel to block the OLB area, resulting in a borderless design that enhances quality while reducing cost.

DETAILED DESCRIPTION OF PREFERRED EMBODIMENTS

Figure 1:
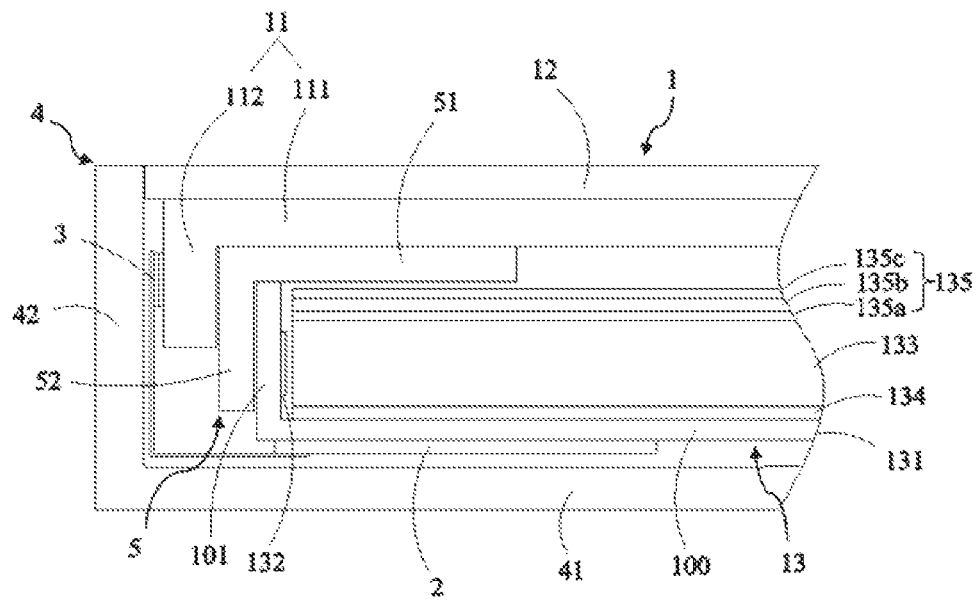
FIG. 1 shows the structure of the display device.

Hereinafter, embodiments of the present disclosure will be described in detail with reference to the accompanying drawings. However, the disclosure may be embodied in many different forms and should not be construed as limited to the specific embodiments set forth herein. Rather, these embodiments are provided to explain the principles of the disclosure and its practical application to thereby enable those of ordinary skill in the art to understand various embodiments of the disclosure and various modifications as are suited to the particular use contemplated. In the drawings, the same reference numerals will always be used to refer to the same elements.

Referring to FIG. 1, the display device provided in this embodiment includes a display panel 1, a driving circuit 2, a chip on film 3 and an outer frame 4. The outer frame 4 includes a bottom frame 41 and a side frame 42. The driving circuit 2 is disposed between the display panel 1 and the bottom frame 41. The display panel 1 includes a TFT array substrate 11. The TFT array substrate 11 includes a display portion 111 and a bending portion 112. The display portion 111 is opposite to the bottom frame 41. The bending portion 112 is disposed opposite to the side frame 42, and the bending portion 112 is connected to the driving circuit 2 through the chip on film 3.

Generally, the TFT array substrate 11 needs to be connected to the driving circuit 2 to receive the driving signal of the driving circuit 2. The driving circuit 2 and the TFT array substrate 11 are connected through the chip on film 3. Therefore, the TFT array substrate 11 generally includes a display area and an Outer Lead Bonding (OLB), wherein the display area is located on the display portion 111, the OLB area is located on the bending portion 112, and the TFT array substrate 11 and the driving circuit 2 are electrically connected by one end of the chip on film 3 to the OLB area for signal transmission.

In this embodiment, the material of the TFT array substrate 11 is selected as a material that can be bent or bent. By disposing the OLB area of the TFT array substrate 11 on the bending portion 112, there is no need to provide an additional front bezel to block the OLB area, so as to realize a borderless design.

The display panel 1 in this embodiment may be an LCD or an OLED. In the following, the display panel in this embodiment is described in detail by taking the display panel 1 as an LCD as an example.

Specifically, the display panel 1 further includes a CF substrate 12 disposed on the display portion 111. The length of the CF substrate 12 in the direction perpendicular to the side frame 42 is greater than the length of the display portion 111 in the direction perpendicular to the side frame 42, that is, as seen from the display surface of the display, the CF substrate 12 completely covers the display portion 111 and the bending portion 112, so that the frame area of the display can be optionally reduced.

The display in this embodiment further includes a liquid crystal layer (not shown) disposed between the TFT array substrate 11 and the CF substrate 12. The display refracts the light by controlling the rotation of the liquid crystal molecules of the liquid crystal layer to generate a picture.

The display device further includes a plastic frame 5 disposed between the TFT array substrate 11 and the bottom frame 41. The plastic frame 5 includes a horizontal portion 51 and a vertical portion 52. The horizontal portion 51 is located between the display portion 111 and the bottom frame 41 and is adhered to the display portion 111. The bending portion 112 is located between the vertical portion 52 and the side frame 42, and the vertical portion 52 is adhered to the bending portion 112.

The display panel 1 further includes a backlight module 13. The backlight module 13 includes a backplane 131, a backlight source 132, and a light guide plate 133. The backlight source 132 is disposed on the backplane 131. The backlight source 132 is disposed opposite to the light incident surface of the light guide plate 133.

The backplane 131 includes a bottom plate 100 and a side plate 101. The vertical portion 52 is located between the side plate 101 and the bending portion 112. The side plate 101 is adhered to the vertical portion 52. The light guide plate 133 is disposed above the bottom plate 100. The driving circuit 2 is disposed on a surface of the bottom plate 100 facing the bottom frame 41.

The backlight source 132 is disposed on the side plate 101. The light incident surface of the light guide plate 133 refers to a surface of the light guide plate 133 facing the side plate 101. The light emitted from the backlight source 132 enters the light guide plate 133 and is reflected by the light output surface of the light guide plate 133 after being reflected many times. The light output surface of the light guide plate 133 refers to a surface of the light guide plate 133 facing the display portion 111.

The backlight module 13 further includes a reflection sheet 134 and an optical film set 135. The reflection sheet 134 is located between the light guide plate 133 and the bottom plate 100. The optical film set 135 is located between the light guide plate 133 and the horizontal portion 51. The optical film set 135 includes a diffusion sheet 135a, a lower brightness enhancement film 135b and an upper brightness enhancement film 135c. The lower brightness enhancement film 135b is located between the upper brightness enhancement film 135c and the diffusion sheet 135a, and the diffusion sheet 135a is located between the lower brightness enhancement film 135b and the light guide plate 133. The upper brightness enhancement film 135c and the lower brightness enhancement film 135b in this embodiment are both prism sheets.

Figure 2:
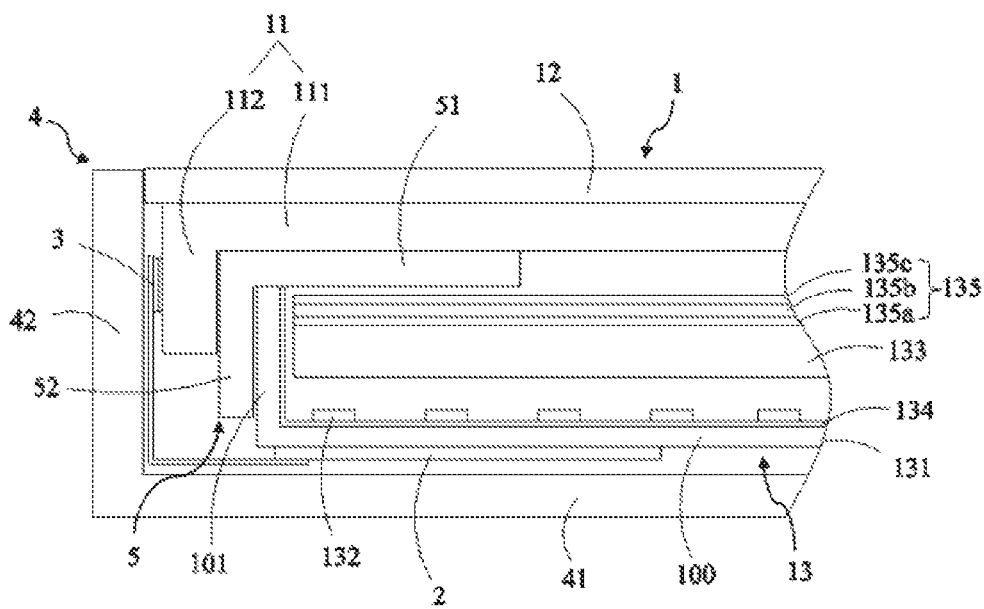
FIG. 2 is another structural schematic diagram of the display device.

Referring to FIG. 2, in another embodiment of the present embodiment, the backlight source 132 is disposed on the bottom plate 100 and between the bottom plate 100 and the light guide plate 133.

The reflection sheet 134 is disposed between the backlight source 132 and the bottom plate 100. In addition, the reflection sheet 134 further extends and covers a side of the side plate 101 facing the light guide plate 133. In this embodiment, the light incident surface of the light guide plate 133 refers to a surface of the light guide plate 133 facing the bottom plate 100. In the manner of this embodiment, when the backlight module 13 is a direct type, the light guide plate 133 in FIG. 2 may be omitted.

The foregoing descriptions are merely specific implementation manners of the present application. It should be noted that those skilled in the art may make various improvements and modifications without departing from the principle of the present application, and these improvements and modifications should also be considered as falling within the protection scope of the present application.

What is claimed is:

1. A display device, comprising a display panel, a driving circuit, a chip on film, and an outer frame, wherein the outer frame comprises a bottom frame and a side frame, the driving circuit is located between the display panel and the bottom frame, the display panel comprises a TFT array substrate, the TFT array substrate comprises a display portion and a bending portion, the display portion is disposed opposite to the bottom frame, the bending portion is disposed opposite to the side frame, and the bending portion is connected to the driving circuit through the chip on film, wherein the display device further comprises a plastic frame disposed between the TFT array substrate and the bottom frame, the plastic frame comprise a horizontal portion and a vertical portion, the horizontal portion is located between the display portion and the bottom frame and is adhered to the display portion, the bending portion is located between the vertical portion and the side frame, and the vertical portion is adhered to the bending portion, wherein the display panel further comprises a backlight module, the backlight module comprises a backplane, a backlight source and a light guide plate, the backlight source is disposed on the backplane, and the backlight source and a light incident surface of the light guide plate are opposite to each other, wherein the backplane comprises a bottom plate and a side plate, the vertical portion is located between the side plate and the bending portion, the side plate is adhered to the vertical portion, the light guide plate is disposed above the bottom plate, and the driving circuit is disposed on a surface of the bottom plate facing the bottom frame.

2. The display device according to claim 1, wherein the backlight source is disposed on the bottom plate and between the bottom plate and the light guide plate.

3. The display device according to claim 1, wherein the backlight source is disposed on the side plate.

4. The display device according to claim 3, wherein the backlight module further comprises a reflection sheet and an optical film set, the reflection sheet is located between the light guide plate and the bottom plate, and the optical film set is located between the light guide plate and the horizontal portion.

5. The display device according to claim 4, wherein the optical film set comprises a diffusion sheet, a lower brightness enhancement film and an upper brightness enhancement film, the lower brightness enhancement film is located between the upper brightness enhancement film and the diffusion sheet, the diffusion sheet is located between the lower brightness enhancement film and the light guide plate.

6. The display device according to claim 1, wherein the display panel is an OLED.

7. The display device according to claim 1, wherein the display panel further comprises a CF substrate disposed on the display portion, a length of the CF substrate in a direction perpendicular to the side frame is greater than a length of the display portion in the direction perpendicular to the side frame.

* * * * *